United States Patent
Nichols et al.

(10) Patent No.: US 10,900,986 B2
(45) Date of Patent: Jan. 26, 2021

(54) PEDAL ACTIVITY SENSOR AND METHODS OF PEDALING ANALYSIS

(71) Applicant: SRAM, LLC, Chicago, IL (US)

(72) Inventors: Geoff Nichols, San Luis Obispo, CA (US); Brian Jordan, Highland Park, IL (US); Sarah Fanto, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 16/531,856

(22) Filed: Aug. 5, 2019

(65) Prior Publication Data

US 2019/0353676 A1 Nov. 21, 2019

Related U.S. Application Data

(63) Continuation of application No. 15/202,652, filed on Jul. 6, 2016, now Pat. No. 10,416,186.

(51) Int. Cl.
| | |
|---|---|
| *G01P 3/00* | (2006.01) |
| *B62M 6/50* | (2010.01) |
| *B62M 1/36* | (2013.01) |
| *B62J 45/20* | (2020.01) |
| *B62J 45/40* | (2020.01) |
| *B62J 50/20* | (2020.01) |
| *B62J 99/00* | (2020.01) |

(52) U.S. Cl.
CPC ................ *G01P 3/00* (2013.01); *B62M 1/36* (2013.01); *B62M 6/50* (2013.01); *B62J 45/20* (2020.02); *B62J 45/40* (2020.02); *B62J 50/20* (2020.02); *B62J 99/00* (2013.01)

(58) Field of Classification Search
None
See application file for complete search history.

(56) References Cited

U.S. PATENT DOCUMENTS

| | | | |
|---|---|---|---|
| 5,326,119 A | 7/1994 | Ganoung | |
| 8,899,110 B2 | 12/2014 | Matsumoto | |
| 9,075,076 B2 | 7/2015 | Baechler | |
| 9,810,593 B2 | 11/2017 | Carrasco Vergara et al. | |
| 10,416,186 B2 * | 9/2019 | Nichols | B62M 6/50 |
| 2009/0119032 A1 * | 5/2009 | Meyer | B62M 3/16 |
| | | | 702/44 |

(Continued)

FOREIGN PATENT DOCUMENTS

| | | | | |
|---|---|---|---|---|
| CN | 202827974 | | 3/2013 | |
| CN | 20122046152 | * | 3/2013 | B62M 6/45 |

(Continued)

OTHER PUBLICATIONS

Hongjiang Lyu in BikeLoc: a Real-time High-Precision Bicycle Localization System Using Synthetic Aperture Radar, Aug. 3-4, 2017, 7 pages.

*Primary Examiner* — Tung S Lau

(57) ABSTRACT

An apparatus for determining bicycle pedaling may include a sensor that detects the angular velocity and/or position of a drivetrain or rear sprocket assembly of the bicycle The apparatus may determine values indicative of pedaling. The apparatus may be configured to be housed within a component of the bicycle, such as within a hollow opening of the spindle or crank axle. The apparatus also may include a wireless transmitter to communicate with another component, such as a suspension controller.

20 Claims, 11 Drawing Sheets

(56) References Cited

U.S. PATENT DOCUMENTS

| | | | |
|---|---|---|---|
| 2010/0093494 A1* | 4/2010 | Smith | G01L 3/104 |
| | | | 482/8 |
| 2010/0263468 A1 | 10/2010 | Fisher et al. | |
| 2011/0160945 A1* | 6/2011 | Gale | B60L 15/20 |
| | | | 701/22 |
| 2013/0233126 A1* | 9/2013 | Tetsuka | B62M 3/00 |
| | | | 74/594.1 |
| 2014/0102237 A1 | 4/2014 | Jordan et al. | |
| 2014/0114538 A1 | 4/2014 | Shipman et al. | |
| 2015/0025816 A1* | 1/2015 | Ross | A43B 17/00 |
| | | | 702/44 |
| 2015/0053494 A1 | 2/2015 | Belon et al. | |
| 2015/0111675 A1 | 4/2015 | Shipman et al. | |
| 2015/0228066 A1* | 8/2015 | Farb | G06K 9/00805 |
| | | | 348/148 |
| 2016/0339986 A1 | 11/2016 | Jordan et al. | |
| 2017/0191825 A1* | 7/2017 | Terao | G01B 7/30 |
| 2018/0011122 A1 | 1/2018 | Nichols et al. | |
| 2018/0186419 A1 | 7/2018 | Shipman et al. | |

FOREIGN PATENT DOCUMENTS

| | | | | |
|---|---|---|---|---|
| CN | 103129690 | | 6/2013 | |
| CN | 104077795 | | 10/2014 | |
| CN | 104077795 A | * | 10/2014 | ............. B62M 6/50 |
| CN | 104743038 | | 7/2015 | |
| CN | 201210175230 | * | 6/2016 | ............. B62M 6/50 |
| CN | 104743038 A | * | 7/2017 | ............. B62J 45/40 |
| EP | 2072387 | * | 6/2009 | ............. B62J 99/00 |
| EP | 2433097 | | 3/2012 | |
| EP | 2562073 | * | 2/2013 | ............. B62M 9/122 |
| EP | 2433097 | * | 4/2013 | ............. G01C 22/00 |
| JP | 2002264882 | | 9/2002 | |
| JP | 20010061153 | * | 9/2002 | ............. B62M 6/45 |
| JP | 2014008789 | | 1/2014 | |
| JP | 20120144285 | * | 1/2014 | ............. B62J 99/00 |
| TW | I537175 | | 6/2016 | |
| WO | 2014113874 | | 7/2014 | |
| WO | WO 2014/113874 | * | 7/2014 | ............. G01C 21/12 |
| WO | 2015074140 | | 5/2015 | |
| WO | WO 2015/074140 | * | 5/2015 | ............. G01C 23/00 |
| WO | 2016004780 | | 1/2016 | |
| WO | 2016009535 | | 1/2016 | |
| WO | WO2016004780 | * | 1/2016 | ............. G01P 15/00 |
| WO | WO 2016009535 | * | 1/2016 | ............. B62J 99/00 |
| WO | 2016030768 | | 3/2016 | |
| WO | WO 2016/030768 | * | 3/2016 | ............. G01B 21/32 |

* cited by examiner

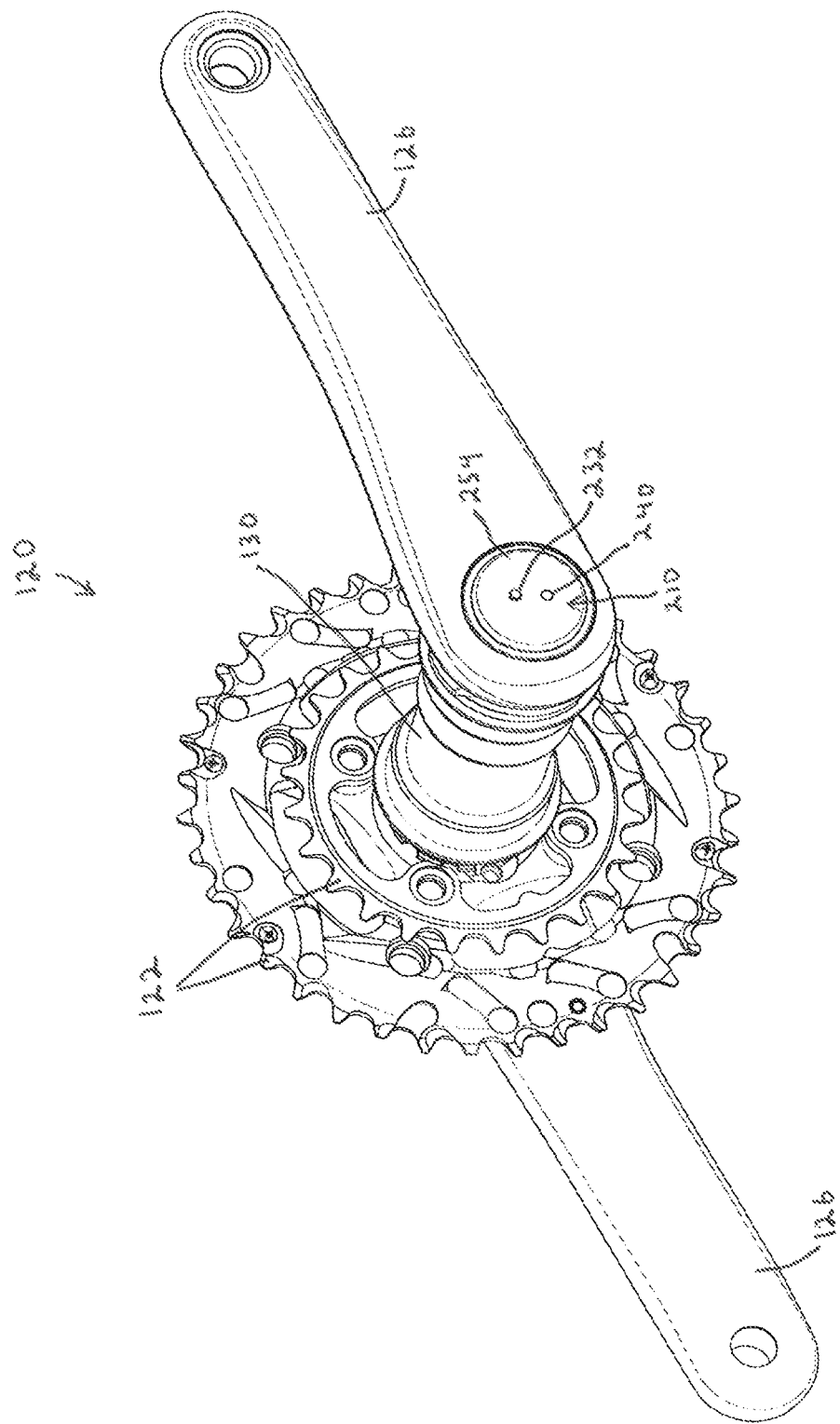

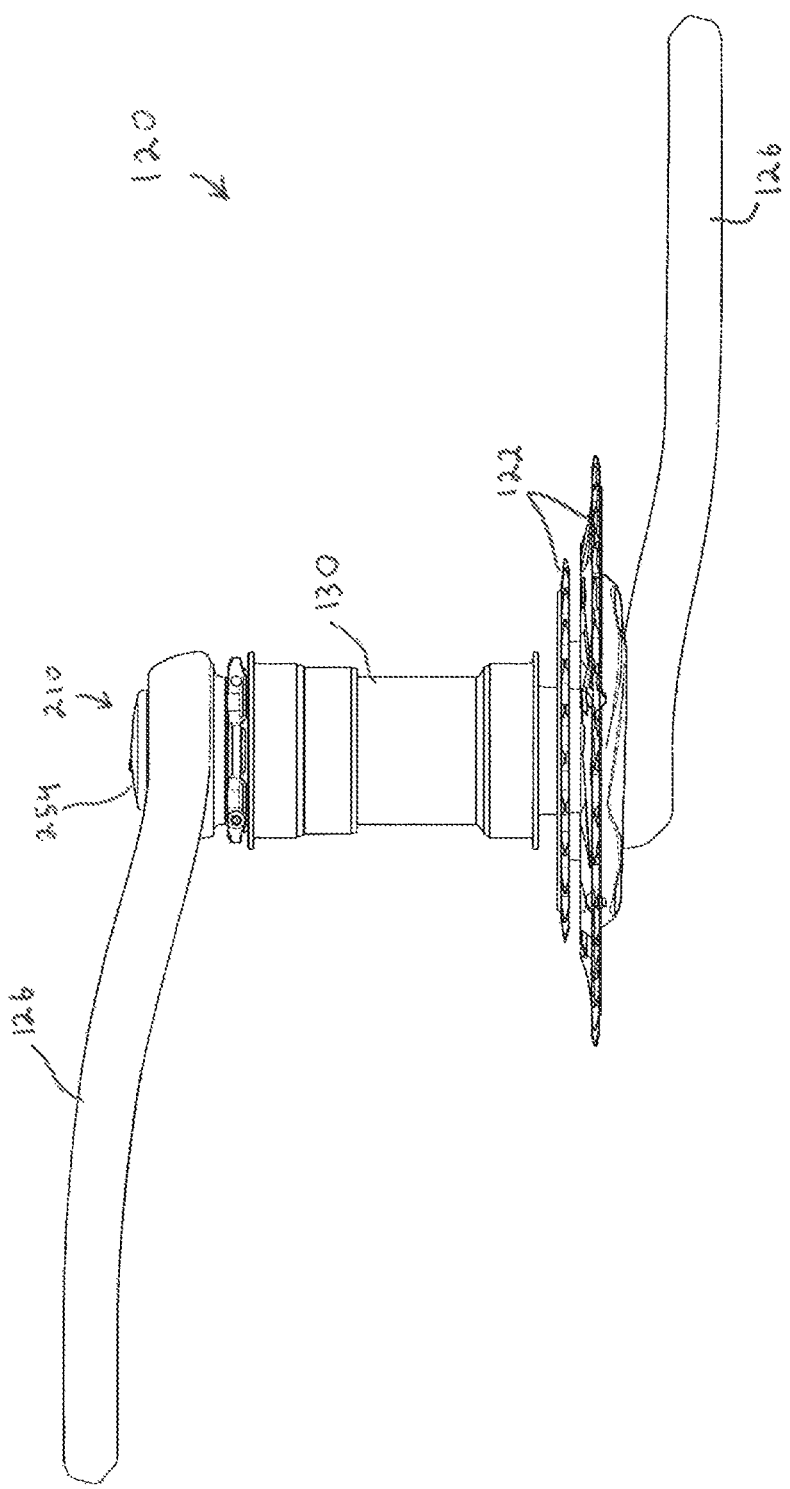

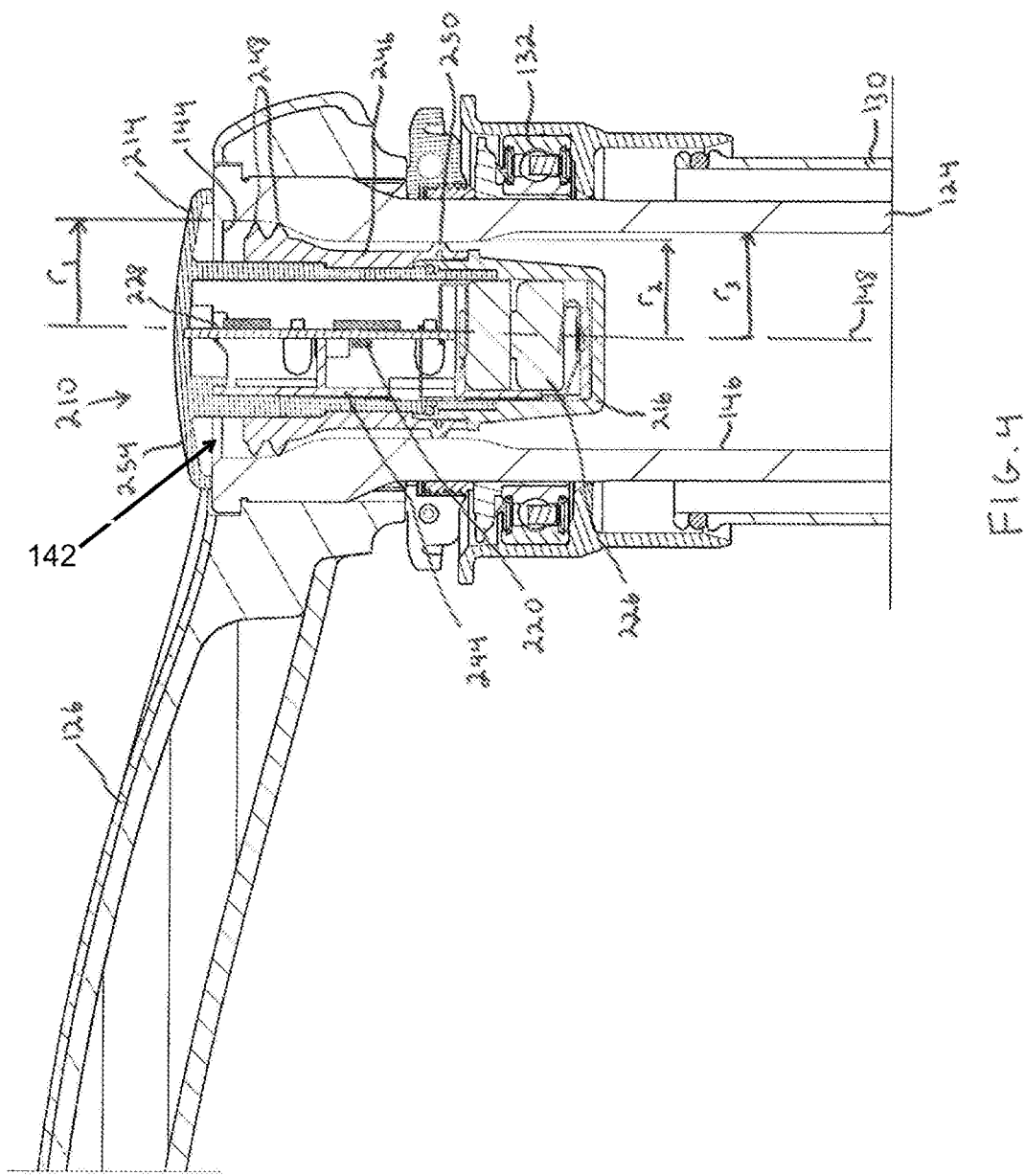

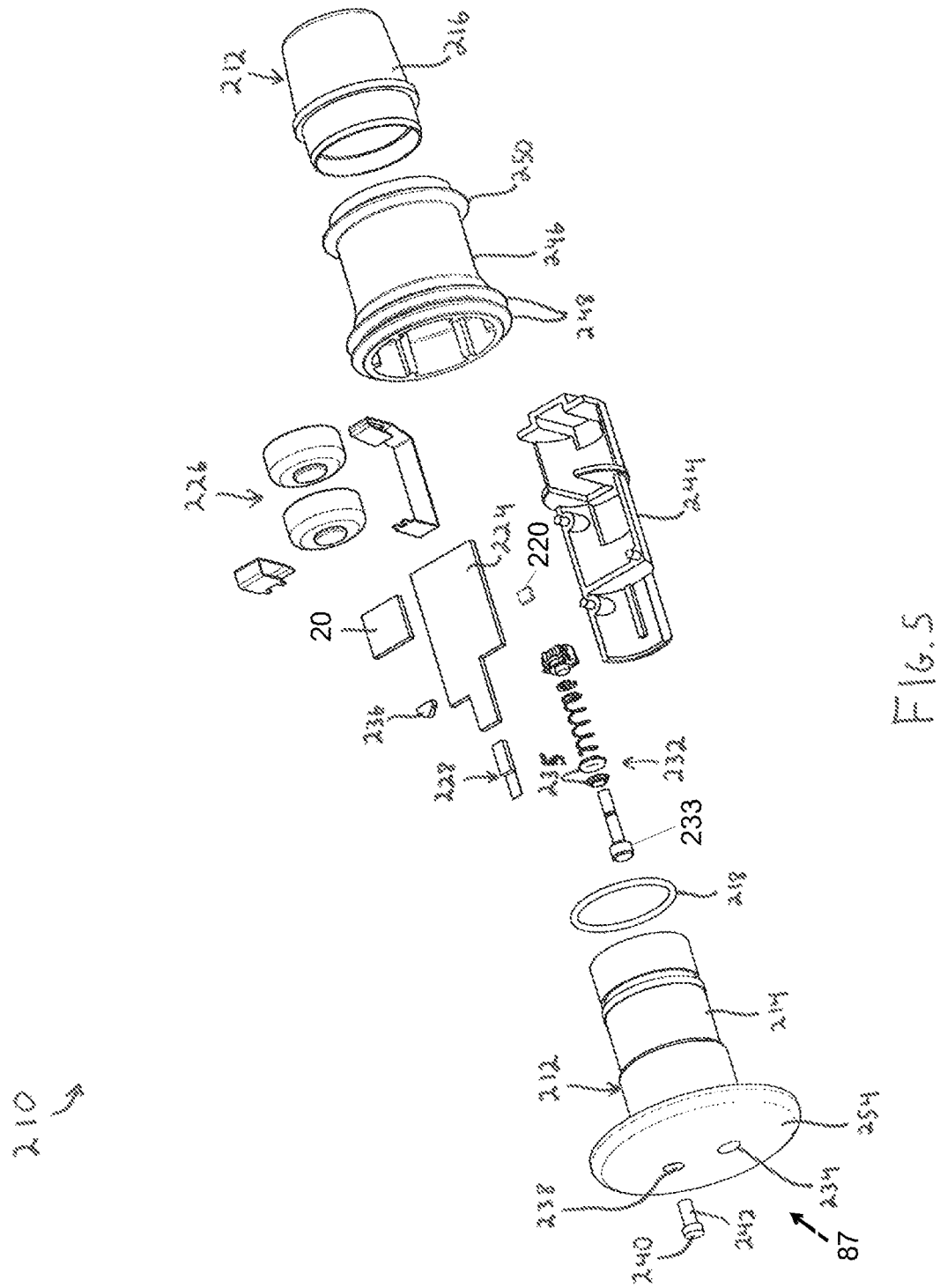

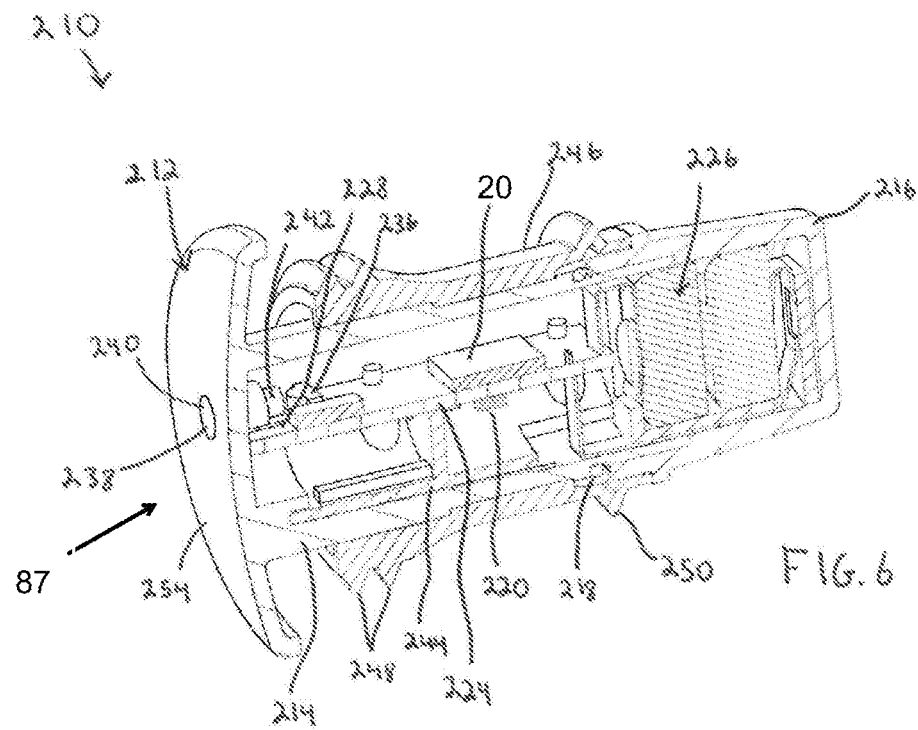
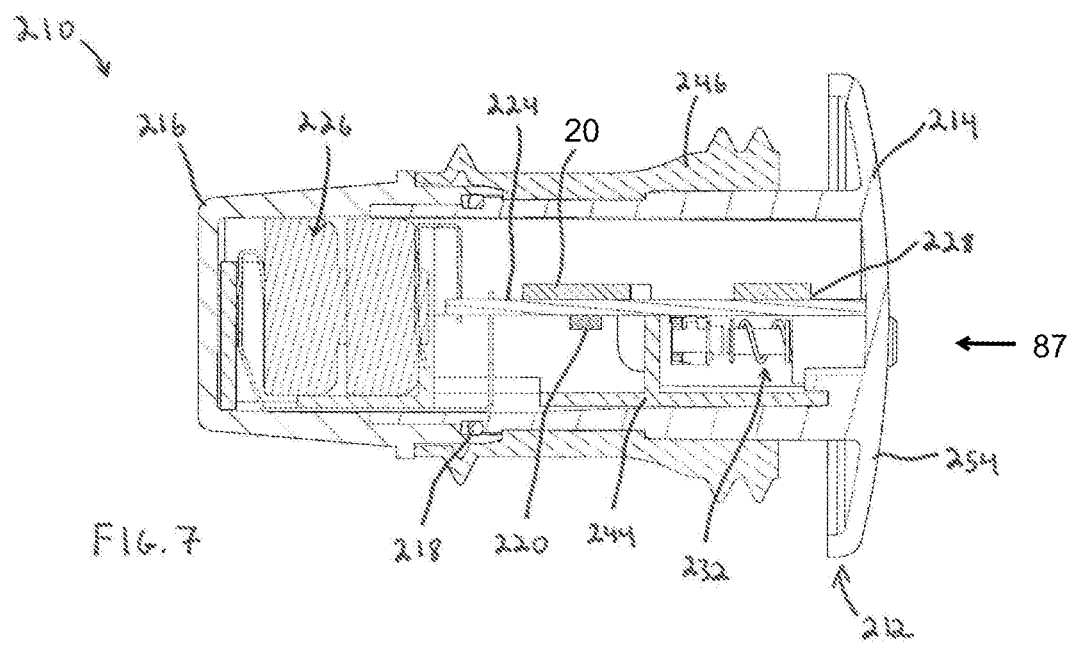

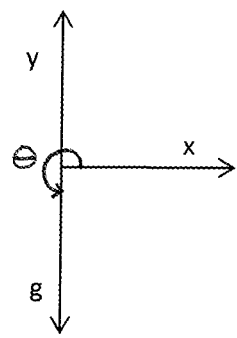
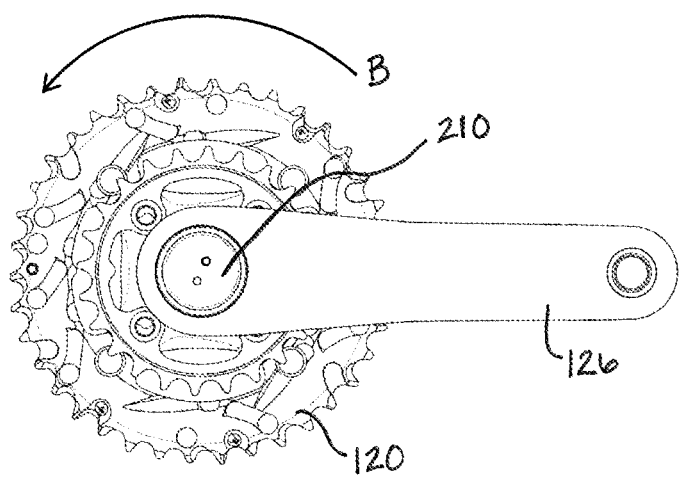
FIG. 8

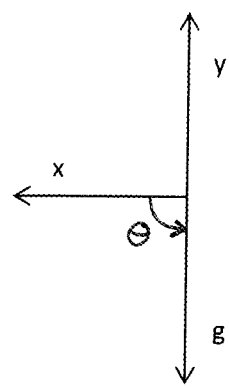
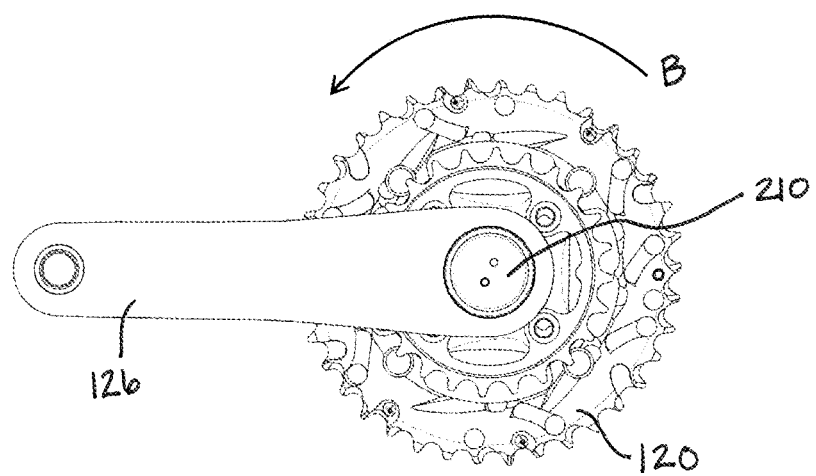
FIG. 9

PEDAL ACTIVITY SENSOR AND METHODS OF PEDALING ANALYSIS

This application is a continuation of U.S. patent application Ser. No. 15/202,652, filed Jul. 6, 2016, the contents of which are herein incorporated in their entirety

BACKGROUND

Traditional bicycle cadence sensors rely on magnets mounted on a bicycle crank arm to generate electronic signals reflective of the rate at which the crank arm turns. In addition to requiring multiple components, e.g., a magnet mounted to the crank arm and a sensor mounted to the bicycle frame, such sensors also may include one or more wires in order to transmit data to a control or display element. Such systems typically only generate at most one reading per revolution, due to the presence of a single magnet mounted to the crank arm. While it is possible to increase the frequency of reporting, e.g., by mounting additional magnets to the crank arm, such modifications further complicate the system by requiring additional components, increasing the odds that one or more components break, fall off, or become misaligned, thereby defeating any potential benefits. Additionally, such systems only report that the wheel is turning for any reason and may not accurately report the presence of pedaling.

At the same time, many modern mountain bicycles are equipped with suspensions in order to provide a more comfortable, less jarring ride on uneven terrain. Sophisticated mountain bicycles also may include suspension controls to refine the damping effects of those suspensions even further. The pedaling state of the bicycle may affect the desired suspension control settings. Further, false or slow indications of a pedaling state of the bicycle may result in poorly controlled suspensions.

SUMMARY

In an embodiment, an apparatus for analyzing bicycle pedaling determination includes a sensor mounted to and rotating with a portion of a drivetrain. The sensor is configured to detect the angular velocity and the position of a crank axle of the drivetrain. A processor is electrically coupled to the sensor and is configured to cause the apparatus to compare the detected angular velocity and position against angular velocity and position values indicative of at least one pedaling state to determine a pedaling state of the drivetrain.

In an embodiment, a method for bicycle pedaling analysis includes the step of sensing, using a sensor mounted to and rotating with a portion of a drivetrain, the angular velocity and position of the portion relative to a frame of reference. The method also includes the step of comparing, by a processor, the angular velocity and position measurements against values representing at least one pedaling state signature to determine a pedaling state of the drivetrain.

In an embodiment, a crank axle configured for use in a bicycle drivetrain includes a sensor mounted to and rotating with the crank axle that is configured to detect the angular velocity and position of the crank axle. The crank axle also includes a wireless transmitter configured to communicate with a bicycle component external to the crank axle, at least one memory configured to store angular velocity and position values representing at least one pedaling state, and at least one processor communicatively coupled to the memory, the sensor, and the wireless transmitter. The at least one processor is configured to cause the apparatus to compare the detected angular velocity and position against at least one pedaling state signature, determine a pedaling state based on the comparison, and transmit the determination to the component of the bicycle external to the crank axle.

In an embodiment, an apparatus for detecting a pedaling state of a drivetrain of a bicycle includes a sensor configured to detect the angular velocity and position of a crank axle of the drivetrain. The apparatus further includes a casing configured to house and position the sensor along an axis of rotation of the crank axle.

BRIEF DESCRIPTION OF THE DRAWINGS

FIG. 2 illustrates crank assembly of a drivetrain, such as the drivetrain for the bicycle of FIG. 1;

FIG. 3 is a top view of the crank assembly of FIG. 2;

FIG. 4 is a cross-sectional view of a portion of the drivetrain, such as the drivetrain for the bicycle of FIG. 1, including an apparatus coupled to the drivetrain for pedal detection;

FIG. 5 is an exploded view of the apparatus for pedal detection shown in FIG. 4;

FIG. 6 is an isometric cross-sectional view of the apparatus for pedal detection shown in FIG. 4;

FIG. 7 is cross-sectional view of the apparatus for pedal detection shown in FIG. 4, taken in the opposite direction as the cross-section of FIG. 4;

FIG. 8 is a side view of the sprockets and one crank arm of FIG. 2 depicted in a first crank position;

FIG. 9 is a side view of the sprockets and one crank arm of FIG. 8 depicted in a second crank position;

Other aspects and advantages of the embodiments disclosed herein will become apparent upon consideration of the following detailed description, wherein similar or identical structures have similar or identical reference numerals.

DETAILED DESCRIPTION

An apparatus including a sensor may be used to detect the angular velocity and position of a component of a drivetrain or a rear sprocket assembly. Further, such an apparatus may also determine a pedaling state of a bicycle. For example, the apparatus may be configured to determine whether a bicycle rider is pedaling or not pedaling by comparing the detected angular velocity and/or angular position against stored values indicative of a pedaling state signature. Similarly, once a pedaling state has been determined, for example that the rider is actively pedaling, the sensor may continue to detect angular velocity and position values in order to determine when the pedaling state changes, such as when the rider stops pedaling. A pedaling state may be any characterized rotation of the drivetrain. For example, values indicative of active pedaling, reverse pedaling, and/or no pedaling may be stored as signatures for the respective pedaling states, and used as a comparison to determine a current pedaling state of a bicycle. Different values and types of values (e.g.

rotational velocity, rotational position, etc.) or combinations thereof, may be used for different pedaling state determinations.

The apparatus may provide compact, wireless, responsive, low latency, real time, low power detection, and/or communication with other components affixed to or separate from a bicycle, including, e.g., a separate suspension controller. In contrast to magnetic cadence sensors, which typically detect a signal once per revolution of the crank axle, wheel, etc., the present sensor advantageously may be configured to detect angular velocity and position in less than a single revolution and/or more than once per revolution of the crank axle, wheel, or other drive-train component. For example, the present sensor may be configured to detect angular velocity and position in as quickly as between about $\frac{1}{16}$ and about $\frac{1}{8}$ of a revolution.

Figure 1:
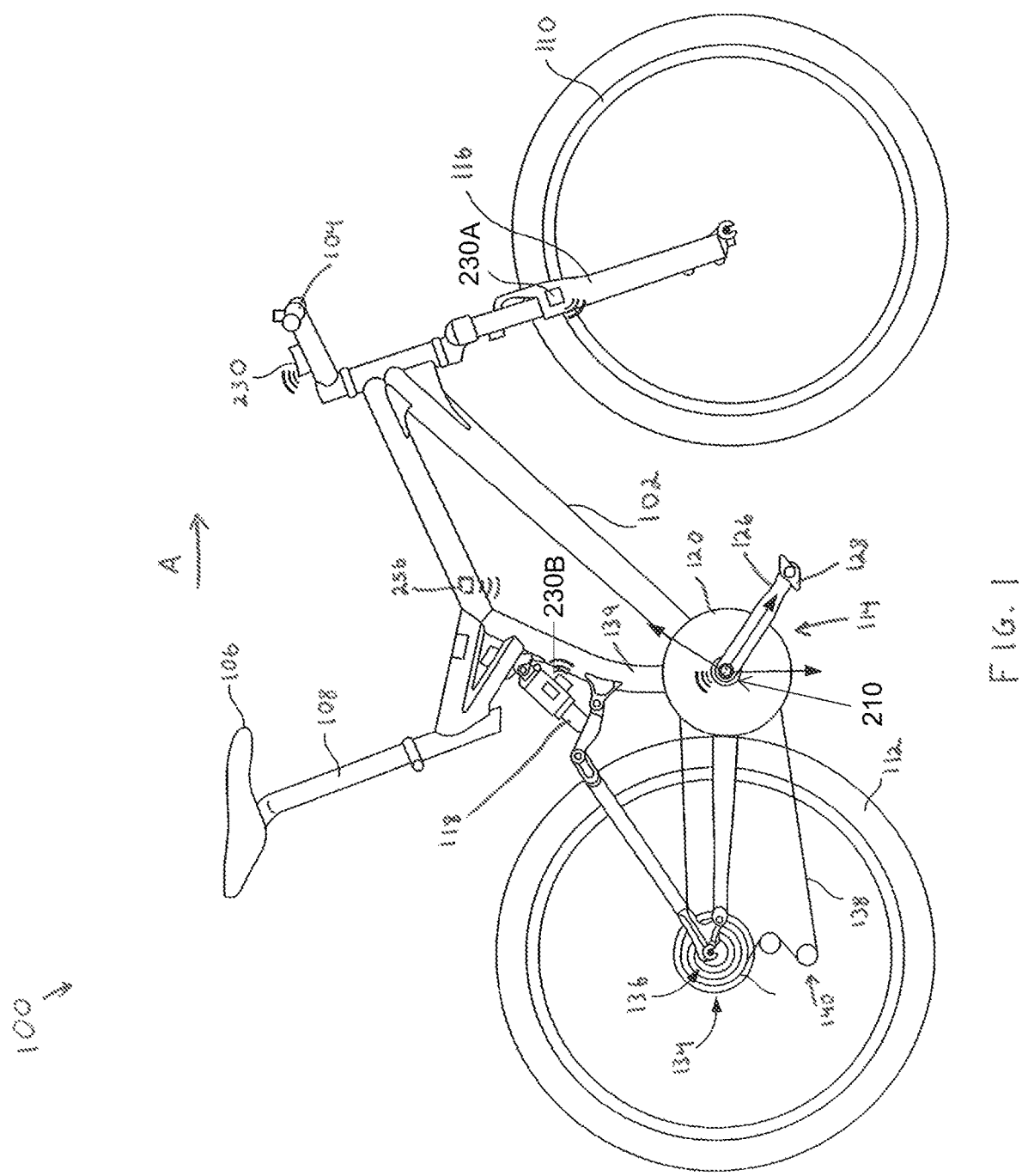
FIG. 1 is a side view of a bicycle, which may be used to employ a pedal detection sensor.

FIG. 1 generally illustrates a bicycle 100 with which a pedaling sensor may be used. The bicycle 100 includes a frame 102, handlebars 104, and a seat 106 coupled to a seat post 108. The bicycle 100 also includes a first or front wheel 110 and a second or rear wheel 112 rotatably attached to the frame 102 and a drivetrain 114. The bicycle 100 additionally may include a suspension system, which may include one or more of a first or front suspension 116 and a second or rear suspension 118.

While the illustrated bicycle 100 is a mountain bicycle, the embodiments disclosed herein may be implemented with other types of bicycles such as, for example, road bicycles. The front and/or forward orientation of the bicycle 100 is indicated by the direction of arrow "A". As such, a forward direction of movement for the bicycle is indicated by the direction of arrow A.

As illustrated in FIGS. 1-4, the drivetrain 114 includes a crank assembly or crankset 120 that, in turn, includes one or more chainrings or first sprockets 122, a crank axle or spindle 124, and a pair of crank arms 126. Each crank arm 126 is operatively coupled to a respective pedal 128. The spindle 124 is coaxially and rotationally journaled within a bottom bracket 130 using one or more bearings 132. The bottom bracket 130 is fixed within a bottom bracket shell (not shown) within the frame 102. The drivetrain 114 may be operatively coupled to a rear sprocket assembly such as a cassette 134 including one or more second sprockets 136 coaxially mounted with the rear wheel 112 via a chain 138. The bicycle also illustrates an apparatus 210 that may be used to determine a pedaling state of the bicycle 100 installed in the drivetrain 114. As shown in FIG. 1, the apparatus 210 is installed on a drive side end of the crank axle or spindle 124. The apparatus 210 may also be installed on a non-drive side of the crank axle or spindle 124, for example as is shown in FIGS. 3-5. Other locations of the bicycle 100 and/or drivetrain 114 may also provide for installation of the apparatus 210 as is described herein.

In order to effectuate shifting, the bicycle 100 may include a front gear change mechanism, such as a first or front derailleur (not shown), which may be may be positioned on a seat tube 139 adjacent the crankset 120 so as to effect gear changes to the front sprockets 122. The front gear change mechanism may be mechanically (e.g. cable, hydraulic, pneumatic) or electrically (e.g. wired, wireless) controlled. Additionally or alternatively, the bicycle 100 may include a rear gear change mechanism 140, such as a rear derailleur, mounted to a member of the frame 102 of the bicycle 100, such as a mount, rear dropout, and/or an associated structure, in a position to effect gear changes in the rear sprockets 134. The rear gear change mechanism 140 also may be mechanically or electrically controlled.

Figure 12:
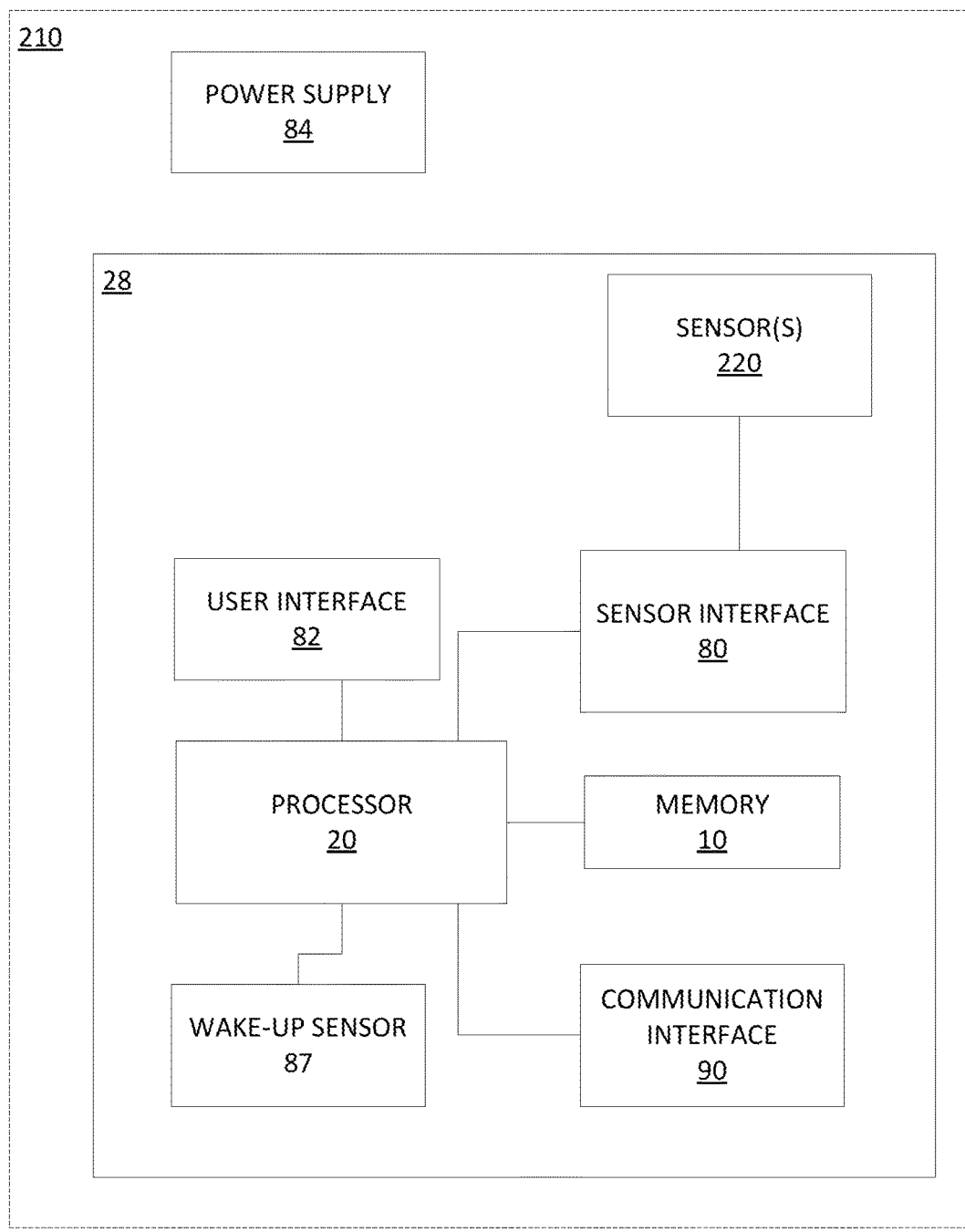
FIG. 12 is a block diagram of an embodiment of a control unit.

A block diagram of an exemplary apparatus 210 for bicycle pedaling determination and/or analysis is shown in FIG. 12. The apparatus 210 may be used alone to communicate with and/or control bicycle components or other devices. The apparatus 210 includes circuitry 28 which includes at least one processor 20 and a memory 10. In the illustrated embodiment, the circuitry 28 also includes a user interface 82, a sensor interface 80, and a communication interface 90. Circuitry 28 may also include component connections and/or electrically connecting materials embedded in a substrate material. The system also includes at least one sensor 220 in communication with the sensor interface 80. Additional, different, or fewer components are possible for the apparatus 210. For example, the user interface 82 may not be included in a circuitry 28 and/or the apparatus 210. Also, components may be combined. In an embodiment, the apparatus is integrated with a component of a power train of a bicycle, such as a chainring, chainring carrier, and/or a spindle.

FIG. 5 illustrates an exploded view, and FIGS. 6 and 7 illustrate sectional views, of the apparatus 210 that may be used to determine a pedaling state of the bicycle 100. The apparatus 210 may include a casing or housing 212 having, e.g., a first housing portion 214 and a second housing portion 216. The housing portions may be configured to couple together, e.g., by press fit or threaded engagement. Additionally, a seal 218, e.g., an O-ring or a gasket, may be disposed between the housing portions when coupled, thereby forming a sealed, watertight compartment to protect the remaining apparatus components from intrusion by liquids, dirt, dust, or other foreign objects.

The apparatus 210 includes a sensor 220 configured to detect one or more variables. In one embodiment, the sensor 220 is an accelerometer. In other embodiments, the sensor 220 may be a magnetometer, a gyroscope, or any other sensor that may be used to detect changes relative to a frame of reference. For example, the frame of reference may be fixed relative to the apparatus 210, such as a coordinate system that rotates with the apparatus 210. Those changes may include, e.g., one or more of position, linear velocity, angular velocity, linear acceleration, or angular acceleration.

The apparatus 210 also may include a computing device such as a processor 20 and memory 10, described below with respect to FIG. 12. The processor 20 is electrically coupled to the sensor 220 in order to analyze the data recorded by the sensor 220. In one example, the sensor 220 and processor 20 each may be disposed on or affixed to, and electrically or communicatively coupled to, a printed circuit board 224. A power supply 226, such as one or more batteries and/or another power source, also may be electrically coupled to the sensor 220 and the processor 20, e.g., via the printed circuit board 224, in order to power the apparatus 210.

The apparatus 210 further includes a communication interface. The communication interface may include an antenna 228, such as a transmitter antennae or a chip antenna. The communication interface is in electrical communication with the processor 20. The communication interface may include a radio and be configured to transmit data wirelessly, e.g., using radio frequency ("RF") transmissions. The communication interface may be configured to transmit data from the apparatus 210 to another component, using the antennae 228. The communication interface may be configured to communicate with one or more control units 230, 230A, 230B configured to control a component of the bicycle, including, e.g., a suspension controller, a display, and/or another control unit 230. The one or more control units 230, 230A, 230B may be computational devices having components such as a processor 20 and memory 10, as well as other components, described below with respect to FIG. 12. The one or more control units 230, 230A, 230B may be separate from or mounted on another portion of the bicycle, the latter option being shown in FIG. 1. The one or more control units 230, 230A, 230B may be configured to control characteristics or settings of an associated component of the bicycle, such as the front and rear suspensions.

The apparatus 210 additionally may include an interface portion or a user interface 82 such as a switch assembly 232 electrically coupled to the processor 20 and configured to carry out one or more functions including, e.g., turning the apparatus 210 on and/or off and/or initiating the pairing of the apparatus 210 with one or more external devices, such as with the control unit 230, 230A, 230B. The apparatus 210 may be configured such that a portion of the switch assembly 232 protrudes through the housing 212, e.g., via an opening 234 in the first housing portion 214. The switch assembly 232 also may include sealing features such as one or more gaskets 235 to prevent the intrusion of liquids, dirt, dust, or other foreign objects.

Still further, the user interface 82 of the apparatus 210 may include an indicator 236 or status indicator such as an LED electrically coupled to one or more of the sensor 220, processor 20, circuit board 224, power supply 226, antenna 228, and/or switch assembly 232. The indicator 236 may be configured to provide various information to the user, such as informing the user as to when the apparatus 210 is powered on or off, when the sensor 220 is detecting movement, when the apparatus 210 is pairing with a separate control unit 230, 230A, 230B, when the apparatus 210 is transmitting data to the separate control unit, or when the power supply 226 is running low. For example, pressing and holding a button 233 (e.g. a manually operated button) on the switch assembly 232 may open a pairing session with another component, such as the control unit 230, 230A, 230B. When pressed for a predetermined amount of time, the indicator 236 may provide a distinct signal, such as a continuous flashing light, until pairing is successful, at which point the indicator 236 may provide a different distinct signal, such as a solid light. In another example, briefly pressing the button 233 on the switch 232 may initiate a check of the remaining power in the power supply 226. In that case, the indicator 236 may be configured, e.g., through the use of different colored lights, different intensities of light, different durations of flashing, etc., to convey a signal indicative of the remaining power.

The indicator 236 may be disposed internally within the housing 212. Further, the housing 212 may include an opening 238 to permit the indicator 236 to convey relevant information to the outside of the housing 212. Thus, the opening 238 may include a translucent or transparent cover 240 to prevent the intrusion of liquids, dirt, dust, or other foreign objects. It is also contemplated that the cover 240 may include a light tube 242 to assist in transmitting the signal from the indicator 236, through the cover 240, and to the exterior of the housing 212.

The apparatus 210 may include a member 244 configured to securely retain one or more of the sensor 220, processor 20, circuit board 224, power supply 226, antenna 228, switch assembly 232, and indicator 236 within the housing 212. The apparatus 210 also may include or be coupled to another component such as a sleeve 246 for retaining the apparatus 210 in place once installed on the bicycle 100, as discussed in greater detail below. As seen in FIGS. 4, 6, and 7, one or more of the first housing portion 214, the member 244, and the sleeve 246 may axially overlie the antennae 228 of the communication interface and, thus, are preferably made of radio frequency ("RF") transparent materials in order to permit transmission of signals from the antennae 228 of the communication interface through the apparatus 210, e.g., to the separate control unit 230, 230A, 230B. For example, the first housing portion 214 and member 244 may be made of a plastic, such as glass-filled nylon, and the sleeve 246 may be made of a compliant material such as rubber. The second housing portion 216 also may be made of an RF transparent material, although that may not be necessary if the second housing portion 216 does not axially overlie the antennae 228 of the communication interface.

In another embodiment, the antennae 228 of the communication interface may be in electrical communication with the processor 20, but instead of being affixed to the circuit board 224, it may be disposed external to the circuit board 224 and/or the apparatus 210. In this way, it may be possible to dispose the apparatus in a location where RF transparency is not an issue (e.g. away from a distal end of a hollow spindle or crank shaft), or to make the first housing portion and/or member 244 out of materials without regard to RF transparency. In an embodiment, the antennae 228 may be electrically coupled to the processor 20, but physically distinct such that the antennae 228 may be disposed external to a bicycle component (e.g. a spindle or crank shaft), and the rest of the apparatus 210 may be disposed internal to the bicycle component.

The apparatus 210 is configured to be coupled to a component of the bicycle 100. Preferably, the apparatus 210 is coupled to a component in the drivetrain 114. As seen in FIG. 4, in one embodiment, the apparatus 210 is coupled axially within the spindle 124 of the crank set or assembly 120. However, it is also contemplated that the apparatus could be coupled to, e.g., the chainring 122, crank arm 126, pedal 128, or cassette 134. More specifically, the apparatus 210 may be coupled within a non-drive side of the spindle 124, i.e., opposite the side on which the front sprockets 122 are disposed, as is shown in FIGS. 2-4, although in another embodiment the apparatus 210 may be coupled within a drive side of the spindle 124 as is shown in FIG. 1.

The spindle 124 may include a non-uniform, axially-aligned opening 142. Specifically, when moving axially inward from an outer edge 144 of the opening 142, the opening 142 may include a sidewall 146 having a first radial dimension, $r_1$, tapering inward to a second radial dimension, $r_2$, before expanding outward to a third radial dimension, $r_3$, where $r_1$ and $r_3$ may be the same or different. More or fewer radial dimensions may be used in alternate embodiments. The sleeve 246 may include one or more first retaining members 248 to hold the apparatus 210 against the sidewall 146 at one or more locations along the first radial dimension and one or more second retaining members 250 to hold the apparatus 210 against the sidewall 146 at one or more locations along the second radial dimension. Additionally, the sleeve 246 may include one or more third retaining members (not shown) to hold the apparatus 210 against the sidewall at one or more locations along the third radial dimension. Due to the tapering geometry of the opening 142 and the sidewall 146 formed by the transition from the second radial dimension to the third radial dimension, the third retaining members also may serve as a self-locking mechanism to prevent removal or inadvertent backing-out of the apparatus 210 once inserted fully into the opening 142.

In each instance, the retaining members may be, e.g., a portion of resilient material extending outward from the sleeve 246 a greater dimension than portions of the sleeve 246 adjacent to the retaining members. The retaining members 248, 250 also may be continuous or substantially continuous about a perimeter of the sleeve. Thus, in the case where the sleeve is generally cylindrical, the retaining members may resemble barbs when viewed in cross-section, as in FIGS. 4 and 7, while also resembling generally ring-shaped protrusions extending outward from the surface of the sleeve 246 when viewed in profile, as best seen in FIGS. 5 and 6.

It will be appreciated by one of ordinary skill in the art that the sleeve 246 and/or the retaining members 248, 250 are not limited to the configurations shown herein and that they may be modified so as to achieve the same retention function with respect to housings and spindle openings of other shapes and dimensions.

Returning to FIGS. 4 and 6, the antennae 228 may be disposed proximate a distal end 254 of the first housing portion 214 such that, when the apparatus 210 is installed on the bicycle 100, at least a portion of the antennae 228 is not obstructed by portions of the bicycle 100 that are not RF transparent. For example, when coupled axially within the crank axle or spindle 124, the antennae 228 may extend outward along a rotational axis 148 proximate to or outside the opening 142 or outer edge 144 of the crank axle 124 and at least a portion of the crank arm 126 located near the crank axle 124. As such, configuration of the antennae 228 proximate to the distal end 254 and/or the crank axle 124 opening 144 is one way in which the apparatus 210 may be configured to transmit wireless signals to another component of the bicycle with minimal interference from the crank axle 124, or other components of the bicycle 100. Also, the distal end 254 of the first housing portion 214 may be configured to abut or substantially about the outer edge 144 of the crank axle 124 in order to maximize clearance for a rider's foot and/or leg. In another embodiment, the distal end 254 is configured to fit within the opening 142 or outer edge 144 of the crank axle 124 such that the distal end 254 does not protrude from the crank axle 124 opening 144 along the rotational axis 148.

The apparatus 210 may be mounted on any of the components of the drivetrain 114 or the rear sprocket assembly, as mentioned above, and the sensor 220 may be mounted anywhere within the apparatus 210, provided the sensor 220 is within electrical communication with the processor 20. However, it may be desirable to position the sensor 220 such that it is disposed on or proximate to an axis of rotation 148 of the spindle 124 when the apparatus 210 is mounted to the bicycle 100, as seen in FIGS. 1-4. By doing so, the gravity vector and xy-coordinate system may have a common origin, which facilitates the determination of the relative position of the gravity vector and the angular velocity of the apparatus 210. This will also minimize any distortion in the detected angular velocity and position due to forces resulting from acceleration in a direction normal to the rotation of the crank axle 124. Alternatively, the sensor 220 may be configured to mount in a different location. This off-axis mounting still may permit determination of the angular velocity and position values, but the offset may introduce an additional acceleration proportional to a speed at which the apparatus 210 is rotating, thereby complicating the analysis necessary to determine the requisite values. Moreover, because cranks on many modern bicycles are hollow, positioning the apparatus 210 within the crank arm 126 may take advantage of available space and eliminate a need to modify or replace a component of the bicycle in order for that component to be configured to couple to the apparatus, while also facilitating the disposition of the sensor along or at the crank axis 148.

Figure 10:
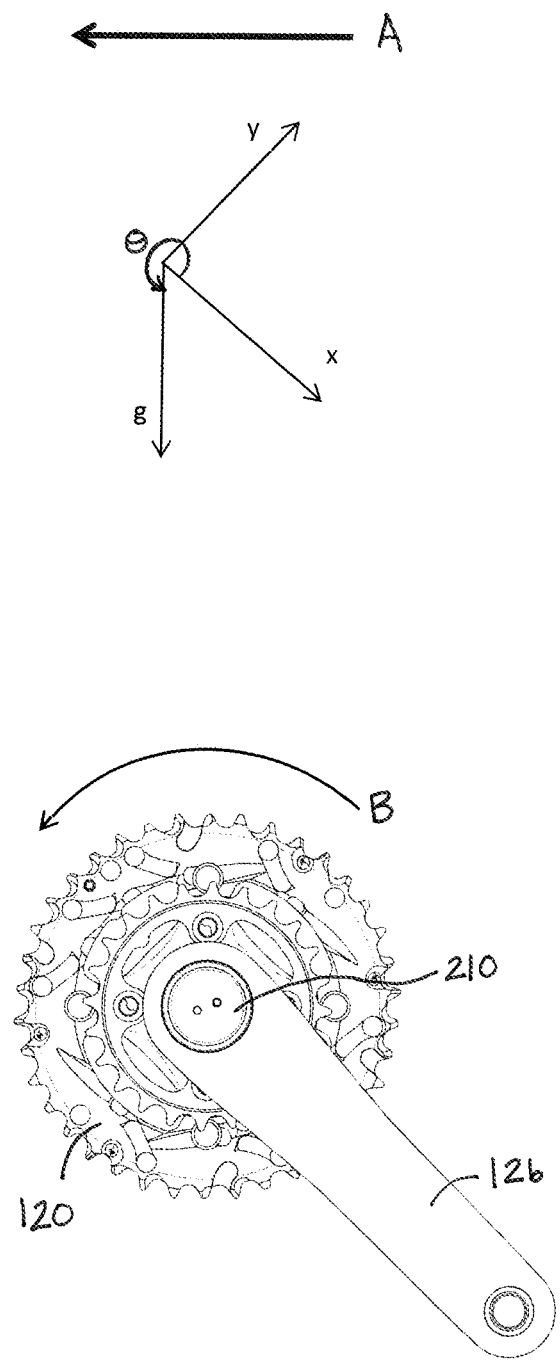
FIG. 10 is a side view of the sprockets and one crank of FIG. 8 depicted in a third crank position.

FIGS. 8-10 illustrate an isolated side view of the crankset or crank assembly 120 from the non-drive side. One crank arm 126, and the apparatus 210 is shown as the crank arm 126 rotates through multiple positions, such as during an active pedaling state. In the embodiment in which the apparatus 210 is inserted on the non-drive side of the crank axle 124, the crank arm 126 shown in FIGS. 8-10 typically will be for the rider's left foot. Accordingly, forward motion in direction A of FIG. 1 corresponds to counterclockwise rotation, i.e., direction "B" in FIGS. 8-10.

As discussed above, the sensor 220 is configured to detect one or more variables, i.e., changes relative to a frame of reference. The sensor 220 may be a type of sensor, such as a magnetic sensor, an acceleration sensor, or other types of sensors. In the embodiment in which the sensor 220 is an accelerometer, as in FIGS. 8-10, the frame of reference may be the xy-coordinate system that rotates with the crank axle 124, and the detected variables may be the angular velocity and position of a gravity vector, "g." In another embodiment, the apparatus 210 may track the velocity and position of a vector, such as a magnetic field vector, corresponding to the Earth's magnetic field, e.g., when the sensor 220 is a magnetometer. Other comparative vectors may be possible, depending on the choice of sensor 220.

The x-axis may be defined as having an origin at the axis of rotation 148 of the crank axle 124 and extending in the direction of the crank arm 126. However, it is also understood that both the origin and direction of the x-axis may be determined by other features, such as the choice of mounting location for the apparatus 210 and the location and orientation of the sensor 220 when the apparatus 210 is installed on the bicycle 100 at that mounting location.

As the apparatus 210 rotates, the sensor 220 may be configured to detect angular velocity and position. Angular position may be represented by the offset angle θ from a reference such as the x-axis to the gravity vector. Angular velocity may be determined, e.g., by calculating the change in angular offset between sampling periods and then dividing that change in angular offset by the elapsed time between those sampling periods.

Memory may be configured to store angular velocity and position values representing one or more pedaling state signatures. The processor 20 may receive the angular velocity and position values from the sensor and compare those detected values against the values stored in memory, i.e., the values indicative of a pedaling state, to determine a pedaling state of the drivetrain 114. In an embodiment, there may be two available pedaling state options, active pedaling and not pedaling. In this embodiment, a single pedaling state signature (e.g. active pedaling) may be used for the comparison, and values found to not indicate the single pedaling state will be designated with the alternate pedaling state (e.g. not pedaling).

Other values for other pedaling state signatures may also be stored. For example, values indicative of a reverse pedaling state, wherein the rider is pedaling in a direction opposite the drive direction of the bicycle drivetrain, may be stored as a reverse pedaling state signature. In another embodiment, there may be three available pedaling state options, active pedaling, reverse pedaling, and not pedaling. In this embodiment, two pedaling state signatures (e.g. active pedaling and reverse pedaling) may be used for the comparison, and values found to not indicate the either pedaling state will be designated with the alternate or third pedaling state (e.g. not pedaling).

It may be desirable to compare both variables against threshold values, because a single variable may correspond to multiple pedaling states. For example, a change in position may occur by active pedaling or if the crank arm 126 is moving freely, such as when the bicycle 100 is loaded on another vehicle and is being transported from one location to another or when the rider repositions the pedals 128 to avoid terrain features and/or prepare to corner. Similarly, a high angular velocity may correspond to active pedaling or to a sudden jolt to the crank arm 126, such as when a rider is coasting and hits a bump. Comparing multiple readings may be desirable, therefore, in filtering out those false positive readings.

The values indicative of a pedaling state may be selected so as to negate the effects of false positives with reasonable certainty. The values may be threshold values, wherein values are chosen such that when one or more of the values are achieved it is determined that the pedaling state corresponding to those threshold values is the pedaling state of the bicycle. In one embodiment, the processor 20 may be provided with threshold values (e.g. in communication with a memory having stored threshold values) of 1 rotation, i.e., $2\pi$ radians, and an angular velocity 4.7 rad/s. The sensor 220 may be configured to detect the presence or absence of pedaling in less than one revolution. For example, the sensor 220 may be configured to detect an active pedaling state with threshold values of between about ½ of a revolution and about ¾ of a revolution, although the sensor 220 may be responsive to changes as low as about 18°, i.e., about $\pi/10$ radians. In another embodiment, a value range may be used as one or more of the values indicative of a pedaling state. For example, the processor 20 may be provided with threshold values (e.g. in communication with a memory having stored threshold values) of 1 rotation, i.e., a radians, and an angular velocity value range of between about 4.7 and about 14.1 rad/s. Other values may also be used to determine a pedaling state. For example, the sign on the angular velocity may indicate a direction of rotation (i.e. positive sign for forward rotation of an active pedaling state, and negative for a reverse pedaling state). In an embodiment, the sign of the angular velocity is used as a threshold value, alone or in combination with other values such as the angular velocity value and/or the angular position. For example, the threshold rotational velocity sign value for active pedaling may be a positive sign of the rotational velocity value.

Once a pedaling state has been determined, the processor 20 may turn on the communication interface in order to begin relaying data. The data may be relayed to a component external to the crank axle, e.g., the one or more separate control units 230, 230A, 230B.

In an embodiment, a reverse pedaling state may be determined and the processor 20 is configured to turn on the communication interface, if the communication interface is not already turned on, and/or cause the communication of a signal or other data indicative of the reverse pedaling state as the current pedaling state for the bicycle to a component of the bicycle. The component may be a control unit, such as the control units 230, 230A, 230B in FIG. 1, of one or more suspension components. The control unit is configured to take an action in response to the reception of the signal or other data. In an embodiment, a front suspension control unit may act to change a characteristic (e.g. a lockout limiting the travel of the suspension may be introduced) of the front suspension upon the receipt of the signal or other data indicating a current, or immediately previous, reverse pedaling state of the bicycle.

In addition to determining a pedaling state, the apparatus 210 also may be configured to determine when a pedaling state changes, such as when a rider stops pedaling. Once the apparatus 210 has determined a pedaling state, it may continue to measure the relevant variables, e.g., position and angular velocity of its frame of reference relative to a gravity vector, until one or more of the variables ceases to be within the indicated range. At that point, the apparatus 210, e.g., via the processor 20, may determine that the user has stopped pedaling and may turn off the communication interface. At the same time, the apparatus 210 may continue sampling the one or more variables until motion again is detected, in order to determine whether the rider has resumed pedaling. The processor 20 may power up the communication interface once a pedaling state of active pedaling is detected.

One or more components may be responsible for determining a pedaling state, or, once a pedaling state is determined, whether the pedaling state has changed. For example, this determining may be carried out by the processor 20 within the apparatus 210 or by the separate control unit 230, 230A, 230B. Preferably, however, determinations are performed by the processor 20, because doing so permits the antenna 228 to be turned off whenever pedaling is not detected to conserve power.

In one embodiment, the apparatus 210 may include a wake-up sensor (e.g. the wake-up sensor 87 as shown in FIG. 12), which also may be used to conserve the power supply 226. The wake-up sensor 87 may be configured to detect motion and to provide power to the processor 20 once such motion has been detected. The wake-up sensor 87 may be the same as or separate from sensor 220. In the latter case, one example of the wake-up sensor may include a ball-in-cage-type switch, where movement of the ball within a conductive cage causes the ball to contact the cage and complete a circuit. In another example the wake-up sensor may be a tilt sensor. It also is contemplated that other types of wake-up sensors may be used as well.

In this manner, the processor 20 may consume power very little to no power unless the apparatus 210 detects motion, and the antenna may not consume power unless the apparatus 210 determines that that motion corresponds to pedaling as opposed to some other cause.

The apparatus 210 additionally may include, or alternatively be in communication with, a second sensor 256 fixed to the bicycle 100 and configured to not rotate with the drivetrain 114 or rear sprocket assembly. The second sensor 256, which may be of the same or different type as the sensor 220, may be configured to detect angular position of the bicycle 100 independent of drivetrain components. The processor 20 may be configured to receive and compare the detected angular position from the sensor 220 and the second sensor 256 in order to filter out readings of angular velocity and position detected by the sensor 220 that correspond to rotation of the bicycle 100 itself, rather than rotation of the drivetrain 114 or rear sprocket assembly 134.

Figure 11:
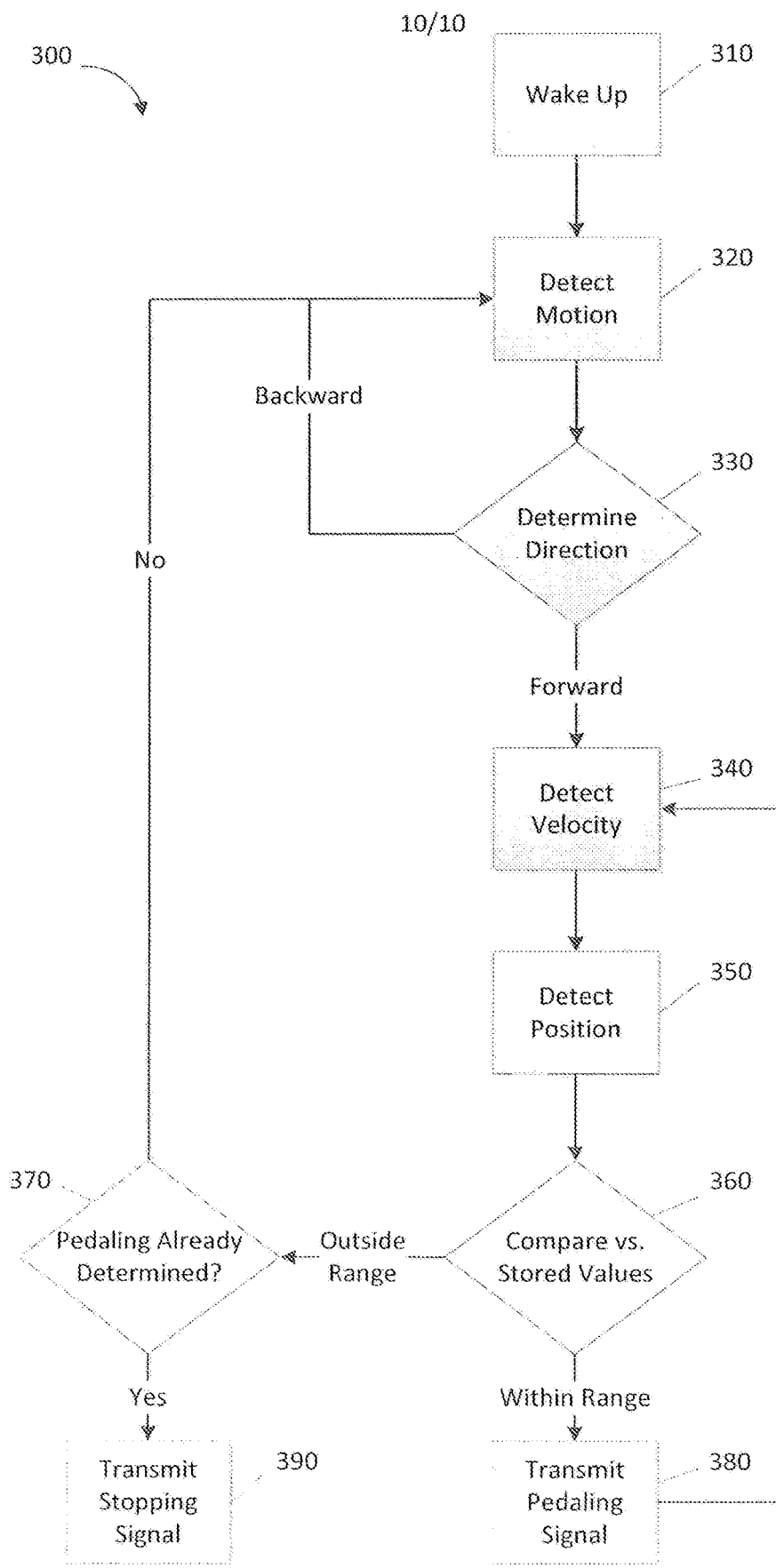
FIG. 11 is a flowchart diagram of a method of pedal detection.

FIG. 11 illustrates a flow chart for a method 300 for bicycle pedaling analysis using the apparatus 210 as configured herein. The method 300 may include the step of waking up 310, e.g., upon detecting any motion. Once awake, the apparatus detects 320 motion and then determines 330 a direction of rotation. If it is determined that the rotation is backwards, the method may return to the detecting step 320 to iterate the method until forward rotation is determined.

Once it is determined that motion is in the forward rotation direction, the method 300 includes the step of detecting 340 a rotational velocity and the step of detecting 350 an amount of rotation. In FIG. 11, step 340 is depicted as preceding step 350, although it will be appreciated that these steps can be reversed or can be performed concurrently.

The detected rotational velocity and position values are then compared 360 against stored values or ranges representing the active pedaling state. If the detected values are outside the stored values or ranges, the method may evaluate 370 whether a pedaling state has already been determined and, if not, the method 300 returns to the detecting step 320. If the detected values are within the stored values or ranges, a signal may be transmitted 380 to another component in addition to or instead of the control unit 230, 230A, 230B, such as a suspension controller, to indicate the presence of pedaling.

The method then may return again to the detecting step 340 and may iterate until the comparing step indicates values that are outside of the stored values or ranges at comparing step 360, at which point the method may proceed to the evaluating step 370, followed by transmitting 390 a signal to the other component to indicate the cessation of pedaling.

Again referring to the apparatus 210 as shown in FIG. 12. The processor 20 may include a general processor, digital signal processor, an application specific integrated circuit (ASIC), field programmable gate array (FPGA), analog circuit, digital circuit, combinations thereof, or other now known or later developed processor. The processor 20 may be a single device or combinations of devices, such as through shared or parallel processing.

The memory 10 may be a volatile memory or a non-volatile memory. The memory 10 may include one or more of a read only memory (ROM), random access memory (RAM), a flash memory, an electronic erasable program read only memory (EEPROM), or other type of memory. The memory 10 may be removable from the apparatus 210, such as a secure digital (SD) memory card. In a particular non-limiting, exemplary embodiment, a computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

The memory 10 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The power supply 84 is a portable power supply. The power supply may involve the generation of electric power, for example using a mechanical power generator, a fuel cell device, photo-voltaic cells, or other power generating devices. The power supply may include a battery such as a device consisting of two or more electrochemical cells that convert stored chemical energy into electrical energy. The power supply 84 may include one battery or a combination of multiple batteries or other power providing devices. Specially fitted or configured battery types, or standard battery types such as CR 2012, CR 2016, and/or CR 2032 may be used.

The communication interface 90 provides for data and/or signal communication from the apparatus 210 to another component of the bicycle, such as one or more suspension controllers, or an external device such as a mobile phone or other computing device. The communication interface 90 communicates the data using any operable connection. An operable connection may be one in which signals, physical communications, and/or logical communications may be sent and/or received. An operable connection may include a physical interface, an electrical interface, and/or a data interface. The communication interface 90 may be configured to communicate wirelessly, and as such include one or more antennae. The communication interface 90 provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Bluetooth®, ANT+™, ZigBee, WiFi, and/or AIREA™ standards may also, or alternatively, be used. Accordingly, replacement standards and protocols having the same or similar functions as those disclosed herein are considered equivalents thereof. In an embodiment, the communication interface 90 may be configured to transmit a signal indicative of a determined and/or detected pedaling state of a bicycle drivetrain. Further, the determined pedaling state may be transmitted wirelessly.

The sensor interface 80 provides for data and/or signal communication from one or more sensors 220 to the circuitry 28. The interface 80 communicates using wired and/or wireless communication techniques. For example, the interface 80 communicates with the sensors 220 using a system bus, or other communication technique. The sensor interface 80 may include additional electric and/or electronic components, such as an additional processor and/or memory for detecting, communicating, and/or otherwise processing signals of the sensors 220.

The user interface 82 may be one or more buttons, lights, or other device or component for communicating data between a user and the apparatus 210. The user interface 82 may include a liquid crystal display ("LCD") panel, light emitting diode ("LED"), LED screen, thin film transistor screen, or another type of display or light emitting devices. The user interface 82 may also include audio capabilities, or speakers.

In an embodiment, the user interface 82 includes an LED indicator. The LED indicator lights to indicate input of the commands or other actions of the apparatus 210.

In accordance with various embodiments of the present disclosure, methods described herein may be implemented with software programs executable by a computer system, such as the circuitry 28. Further, in an exemplary, non-limited embodiment, implementations can include distributed processing, component/object distributed processing, and parallel processing. Alternatively, virtual computer system processing can be constructed to implement one or more of the methods or functionality as described herein.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, or an apparatus 210 to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An apparatus for bicycle pedaling determination, comprising:
   a housing configured to be mounted within a crank axle of a bicycle drive train, the housing comprising a first housing part and a second housing part, the first housing part including retaining members configured to hold the apparatus against an internal sidewall of the crank axle, and the second housing part disposed inside of the crank axle and removably attached to the first housing part;
   a sensor configured to be disposed within the housing, the sensor configured to detect angular velocity and/or position of the crank axle of the bicycle drivetrain; and
   a power supply configured to power the sensor, the power supply disposed in the second housing part.

2. The apparatus of claim 1, wherein the sensor is configured to detect the angular velocity and/or the position of a gravity vector relative to a frame of reference rotating with the crank axle.

3. The apparatus of claim 1, wherein the sensor is disposed so as to minimize distortion of the detected angular velocity and position due to forces resulting from acceleration in a direction normal to the rotation of the crank axle.

4. The apparatus of claim 3, wherein the sensor is configured to be disposed proximate to a rotational axis of the crank axle.

5. The apparatus of claim 1, wherein the sensor is configured to detect the angular velocity or the position of a magnetic field vector relative to a frame of reference rotating with the crank axle.

6. The apparatus of claim 1, wherein the sensor is one of a type of sensor selected from an accelerometer, a magnetometer, or a gyroscope.

7. The apparatus of claim 1, further comprising a wireless transmitter electrically coupled to the processor, the wireless transmitter configured to communicate with a component of the bicycle.

8. The apparatus of claim 7, wherein the component is a suspension controller.

9. The apparatus of claim 7, wherein the wireless transmitter is disposed on a printed circuit board located on the interior of the housing.

10. The apparatus of claim 1, wherein the sensor is configured to measure angular velocity or position in less than a single revolution of the crank axle.

11. The apparatus of claim 1, further comprising:
   a second sensor fixed to a bicycle, the second sensor configured to detect angular position of the bicycle; and
   a controller configured to receive and compare detected angular position from the sensor and the second sensor in order to filter out readings of angular velocity and/or position detected by the sensor that correspond to rotation of the bicycle.

12. The apparatus of claim 11, wherein the first sensor is located in the crank axle at a first position of the bicycle and the second sensor is located at a second position on the bicycle, the first position and the second position being different positions.

13. The apparatus of claim 1, wherein the housing is configured to fit within an opening on a distal end of the crank axle.

14. The apparatus of claim 13, wherein the housing includes a portion configured to contact an external surface of the crank axle at the opening on the distal end leaving a portion of the apparatus external to the crank axle.

15. The apparatus of claim 14, further comprising a wireless transmitter disposed in the portion of the apparatus external to the crank axle.

16. The apparatus of claim 15, wherein the portion of the apparatus external to the crank axle includes an external portion of the housing, the external portion of the housing covers the wireless transmitter, and the external portion of the housing is formed of a radio frequency transparent material.

17. The apparatus of claim 16, further comprising a user interface disposed on the external portion of the housing.

18. The apparatus of claim 17, wherein the user interface comprises a light emitting diode ("LED").

19. The apparatus of claim 18, wherein the LED is coupled to one or more of the sensor, a processor, or the power supply.

20. The apparatus of claim 19, wherein the LED is configured to indicate a power status of the apparatus.

* * * * *